US009245358B2

(12) United States Patent
Wang et al.

(10) Patent No.: US 9,245,358 B2
(45) Date of Patent: Jan. 26, 2016

(54) SYSTEMS AND METHODS FOR GENERATING REFINED, HIGH FIDELITY NORMAL MAPS FOR 2D AND 3D TEXTURES

(71) Applicant: Apple Inc., Cupertino, CA (US)

(72) Inventors: Norman N. Wang, San Jose, CA (US); Timothy R. Oriol, Cupertino, CA (US); Jacques P. Gasselin de Richebourg, Sunnyvale, CA (US); Domenico P. Porcino, Novato, CA (US)

(73) Assignee: Apple Inc., Cupertino, CA (US)

( * ) Notice: Subject to any disclaimer, the term of this patent is extended or adjusted under 35 U.S.C. 154(b) by 48 days.

(21) Appl. No.: 14/292,731

(22) Filed: May 30, 2014

(65) Prior Publication Data

US 2015/0348285 A1    Dec. 3, 2015

(51) Int. Cl.
*G09G 5/00* (2006.01)
*G06T 11/00* (2006.01)
*G09G 5/02* (2006.01)
*G06T 5/00* (2006.01)
*G06T 3/40* (2006.01)

(52) U.S. Cl.
CPC .................. *G06T 11/001* (2013.01); *G06T 3/40* (2013.01); *G06T 5/002* (2013.01); *G06T 5/003* (2013.01); *G09G 5/026* (2013.01)

(58) Field of Classification Search
CPC .............................. G06T 15/04; G06T 11/001
USPC .......................................................... 345/582
See application file for complete search history.

(56) References Cited

U.S. PATENT DOCUMENTS

| 6,518,965 | B2 | 2/2003 | Dye |
| 6,583,790 | B1 | 6/2003 | Wolters |
| 6,765,584 | B1 * | 7/2004 | Wloka ................ G06T 15/04 345/420 |
| 7,037,263 | B2 | 5/2006 | Sumanaweera |
| 8,031,190 | B2 | 10/2011 | Smith |
| 8,289,318 | B1 | 10/2012 | Hadap |
| 8,406,561 | B2 | 3/2013 | Hadap |
| 8,625,931 | B2 | 1/2014 | Hadap |
| 2004/0184653 | A1 | 9/2004 | Baer |

(Continued)

OTHER PUBLICATIONS

Lukas Murmann, :"Relighting for 2D Copy&Paste", Department of Computer Science, University College London, Sep. 2013.*

(Continued)

*Primary Examiner* — Devona Faulk
*Assistant Examiner* — Jin Ge
(74) *Attorney, Agent, or Firm* — Blank Rome LLP

(57) ABSTRACT

Systems, methods and program storage devices are disclosed, which comprise instructions to cause one or more processing units to dynamically generate refined normal maps for 2D texture maps, e.g., supplied by a programmer or artist. Generally speaking, there are two pertinent properties to keep in balance when generating normal vectors comprising a normal map: "smoothness" and "bumpiness." The smoothness of the normal vectors is influenced by how many neighboring pixels are involved in the "smoothening" calculation. Incorporating the influence of a greater number of neighboring pixels' values reduces the overall bumpiness of the normal map, as each pixel's value takes weight from those neighboring pixels. Thus, the techniques described herein iteratively: downsample height maps; generate normal maps; scale the normal maps to maintain bumpiness; and blend the generated scaled normal maps with generated normal maps from previous iterations—until the smoothness of the resultant normal map has reached desired levels.

20 Claims, 9 Drawing Sheets

(56) References Cited

U.S. PATENT DOCUMENTS

| | | |
|---|---|---|
| 2007/0190502 A1 | 8/2007 | Chladny |
| 2012/0008854 A1 | 1/2012 | Shim |
| 2013/0021359 A1 | 1/2013 | Baker |
| 2013/0127889 A1* | 5/2013 | Winnemoeller ...... G06T 11/001 345/582 |

OTHER PUBLICATIONS

Li, J., Song, A. and Zhang, X. 2010. Haptic texture rendering using single texture image. In International Symposium on Computational Intelligence and Design ISCID, 7-10.*

"Sprite Kit Programming Guide." Apple Inc. Cupertino, CA. 2014. p. 1-115.

Morgan, Finn, "Sprite Lamp—Dynamic Lighting for 2D art—Kickstarter," Retrieved from the Internet: URL: http://www.kickstarter.com/projects/finnmorgan/sprite-lamp-dynamic-lighting-for-2d-art [retrieved on May 29, 2014], pp. 1-17.

Goodsell, Brian, "Crazy Bump Tutorial: Understanding Settings for Better Normal Maps—Environment Artwork," Retrieved from the Internet: URL: http://iamsparky.wordpress.com/crazybump/ [retrieved on May 29, 2014], pp. 1-11.

"Scene Kit Programming Guide." Apple Inc. Cupertino, CA. 2012. p. 1-9.

* cited by examiner

SYSTEMS AND METHODS FOR GENERATING REFINED, HIGH FIDELITY NORMAL MAPS FOR 2D AND 3D TEXTURES

BACKGROUND

This disclosure relates generally to the field of image processing and, more particularly, to various techniques for generating refined, high fidelity normal maps to allow 2D and 3D graphics rendering and animation infrastructures to be able to render three-dimensional lighting effects on two-dimensional texture maps—without the need for the corresponding normal maps to be created and/or supplied to the rendering and animation infrastructure by the designer or programmer.

Graphics rendering and animation infrastructures are commonly used by programmers today and provide a convenient means for rapid application development, such as for the development of gaming applications on mobile devices. Because graphics rendering and animation infrastructures may utilize the graphics hardware available on the hosting device to composite 2D and 3D scenes at high frame rates, programmers can create and use complex special effects and texture atlases in games and other application with limited programming overhead.

For example, Sprite Kit developed by APPLE INC., provides a graphics rendering and animation infrastructure that programmers may use to animate arbitrary textured images, or "sprites." Sprite Kit uses a traditional rendering loop, whereby the contents of each frame are processed before the frame is rendered. Each individual game determines the contents of the scene and how those contents change in each frame. Sprite Kit then does the work to render the frames of animation efficiently using the graphics hardware on the hosting device. Sprite Kit is optimized so that the positions of sprites may be changed arbitrarily in each frame of animation.

Sprite Kit supports many different kinds of content, including: untextured or textured rectangles (i.e., sprites); text; arbitrary CGPath-based shapes; and video. Sprite Kit also provides support for cropping and other special effects. Because Sprite Kit supports a rich rendering infrastructure and handles all of the low-level work to submit drawing commands to OpenGL, the programmer may focus his or her efforts on solving higher-level design problems and creating great gameplay. The "Sprite Kit Programming Guide" (last updated Feb. 11, 2014) is hereby incorporated by reference in its entirety.

The inventors have realized new and non-obvious ways to render refined, high fidelity three-dimensional lighting effects on two-dimensional texture maps—without the need for the programmer to undertake the sometimes complicated and time-consuming process of providing a corresponding normal map for each texture that is to be used in his or her application. Using the techniques disclosed herein, the graphics rendering and animation infrastructure may provide the same or similar lighting effects on the texture in "real-time" as would be provided on a texture that was explicitly supplied with normal map by the programmer.

SUMMARY

Methods, computer readable media, and systems for allowing 2D and 3D graphics rendering and animation infrastructures to be able to render refined, high-fidelity three-dimensional lighting effects on two-dimensional texture maps—without the need for the corresponding normal maps to be created and/or supplied to the rendering and animation infrastructure by the designer or programmer are described herein.

In particular, techniques are described herein for generating refined normal maps for arbitrary textures that provide smoothness while maintaining the bumpiness of the resultant generated refined normal map.

The traditional method of rendering lighting and shadows by 2D graphics rendering and animation infrastructures requires the programmer to supply a surface texture and a surface normal map (i.e., two separate files) to the rendering infrastructure. In such a method, a normal vector for each pixel is taken from the surface normal map, read in by a Graphics Processing Unit (GPU), and used to create the appropriate light reflections and shadows on the surface texture.

According to some embodiments described herein, lighting effects may be "turned on" for the texture without the need for the programmer to supply a normal map texture. According to some embodiments, an algorithm may inspect the pixel values (e.g., RGB values) of each individual pixel of the texture, and, based on the pixel value, can accurately estimate where the lighting and shadow effects should be in the source texture file to simulate 3D lighting. The results of this estimation process may be stored in what is referred to herein as a "normal map." According to some embodiments, the normal map may be stored in a typical RGB image file data structure, but with the x- y- and z-coordinates of the estimated normal vector for a given pixel stored in the corresponding R, G, and B values of the pixel in the data structure, respectively.

One dilemma faced when generating a normal map from a supplied texture map is that, due to widely-varying noise levels in input images, it may be difficult to generate a high-fidelity normal map in a manner that works reliably for input images having various noise levels. When attempting to generate a normal map, it is often beneficial to "smoothen" out the texture map, e.g., by downsampling or performing some other type of blurring operation, before estimating the normal map for the texture map. Generally speaking, downsampling or blurring operations may consider neighboring pixel values in the texture map when calculating a smoothened value for a given pixel. However, the more that the texture map is smoothened out, the more the "bumpiness" of the texture map, i.e., the amount of local variation in the texture map, is reduced—resulting in less detailed and less realistic-looking texture maps. Thus, techniques are described herein for generating refined normal maps for arbitrary textures that provide smoothness while maintaining the bumpiness of the resultant generated refined normal map.

Once the refined normal map has been generated, the rendering or animation engine may inform a GPU(s) where the lighting effects should appropriately be applied to the texture—and thus still have the same effect as a texture map that was supplied with a normal map. The lighting effects estimation process may be distributed between a CPU and GPU(s) in order to achieve near real-time speed, e.g., by splitting each source texture into blocks of image data and then distributively processing the blocks of image data on the CPU and GPU(s), gathering the results directly back on the GPU(s), and then using the result immediately for the current rendering draw call.

Thus, in one embodiment disclosed herein, a non-transitory program storage device, readable by a programmable control device, may comprise instructions stored thereon to cause one or more processing units to: (a) obtain a representation of a first two-dimensional image, wherein the representation comprises a first plurality of pixels, and wherein each pixel in the first plurality of pixels comprises a first plurality of pixel color values and a transparency value; (b) convert the first plurality of pixel color values into a luminance value for each pixel in the first plurality of pixels; (c) create a height map over the first two-dimensional image using the converted luminance values for each pixel in the first plurality of pixels, wherein each position in the height map corresponds to a pixel from the first plurality of pixels; (d) create a first normal map over the first two-dimensional image by calculating a normal vector for each pixel in the height map, wherein calculating the normal vector for a respective pixel comprises calculating the gradient of the height map at the position corresponding to the respective pixel; (e) create a first blurred height map according to a first parameter; (f) create a second normal map over the first two-dimensional image by calculating a normal vector for each pixel in the first blurred height map, wherein calculating the normal vector for a respective pixel comprises calculating the gradient of the first blurred height map at the position corresponding to the respective pixel; (g) scale the second normal map in accordance with a range of the first normal map; (h) blend the second normal map with the previously-created normal map to create a resultant normal map; and (i) repeat steps (e)-(h) iteratively, increasing the value of the first parameter with each iteration.

In still other embodiments, the techniques described herein may be implemented as methods or in apparatuses and/or systems, such as electronic devices having memory and programmable control devices.

DETAILED DESCRIPTION

Figure 1:
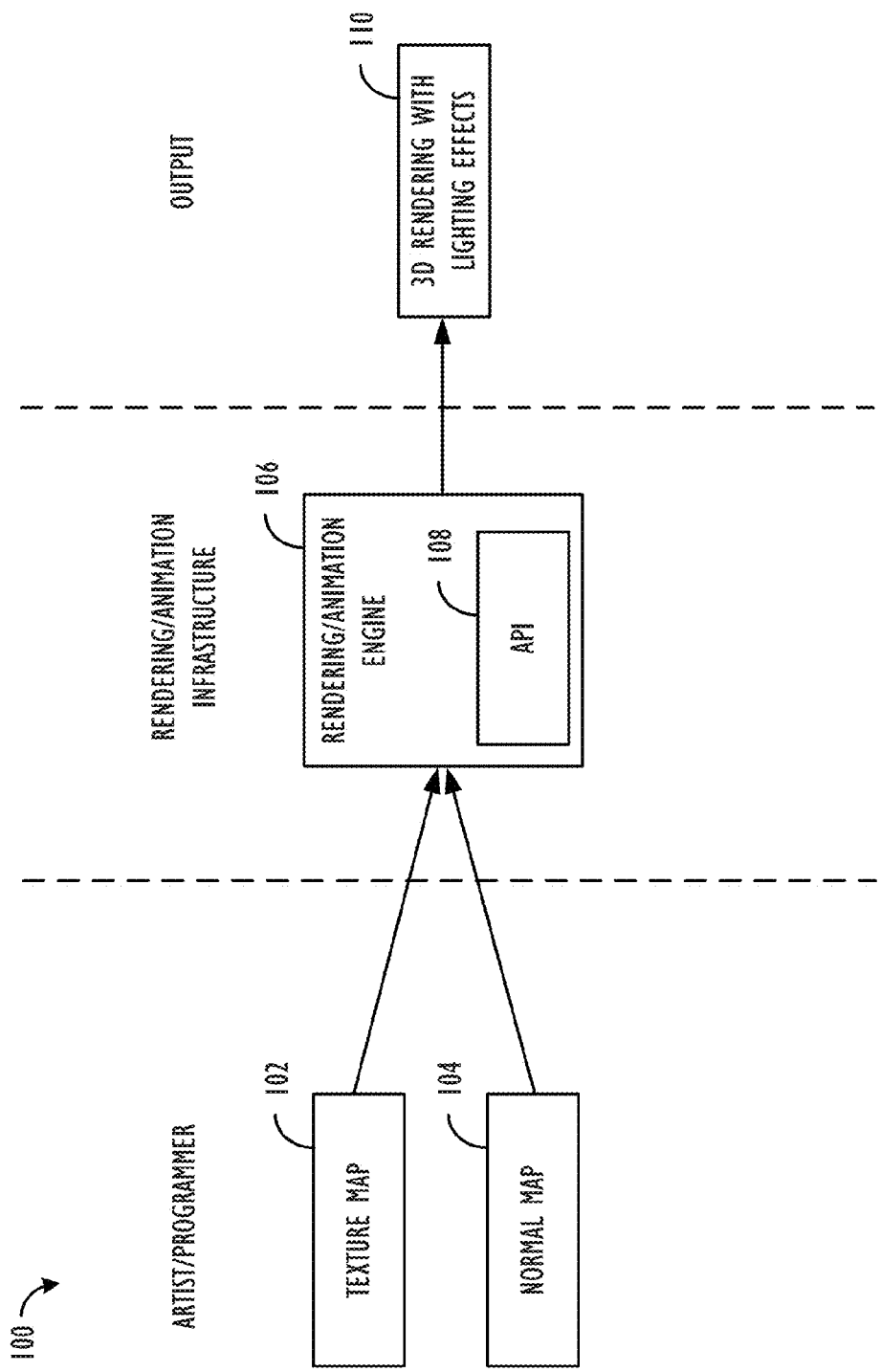
FIG. 1 illustrates a graphics rendering and animation infrastructure, in accordance with the prior art.

Systems, methods and program storage devices are disclosed, which comprise instructions to cause one or more processing units to dynamically generate refined normal maps for provided 2D texture maps. Generally speaking, there are two pertinent properties to keep in balance when generating the normal vectors comprising a normal map: "smoothness" and "bumpiness." The smoothness of the normal vectors is influenced by how many neighboring pixels are involved in the "smoothening" calculation, but incorporating the influence neighboring pixels values reduces the overall bumpiness of the normal map as it starts to take weights from those neighboring pixels.

The techniques described herein seek to sufficiently increase smoothness while maintaining overall bumpiness by first estimating the height of the pixels in the image and then performing downsampling on the heights to provide smoothness. Then, in order to maintain the bumpiness of the texture map for the normal vector calculation, the techniques may rescale the normal vectors based on the range of the pixel heights before the downsampling—so that the bumpiness will remain the same, regardless how expansive the smoothness calculation is. This process may then be repeated iteratively, blending together each generated normal map with the generated normal map from the previous iteration—such that additional details may be picked up with each iteration—until a desired level of smoothness had been achieved.

The techniques disclosed herein are applicable to any number of electronic devices with displays: such as digital cameras, digital video cameras, mobile phones, personal data assistants (PDAs), portable music players, monitors, and, of course, desktop, laptop, and tablet computer displays.

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described in this specification. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one implementation of the invention, and multiple references to "one embodiment" or "an embodiment" should not be understood as necessarily all referring to the same embodiment.

It will be appreciated that, in the development of any actual implementation (as in any development project), numerous decisions must be made to achieve the developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design of an implementation of image processing systems having the benefit of this disclosure.

Referring now to FIG. 1, a graphics rendering and animation infrastructure 100 is shown, in accordance with the prior art. On the left-hand portion of FIG. 1, assets provided by the artist and/or programmer of the application, including texture map 102 and normal map 104 are shown in block diagram form. As explained above, in traditional rendering systems, a programmer would provide the rendering engine with both texture map 102 and normal map 104 so that the rendering engine could approximate realistic 3D effects, including lighting effects, on the surface of the texture. One consequence of this prior art approach is that the 3D renderings remain "static," i.e., since only a single normal map is provided for any given texture by the programmer, the application cannot update the lighting effects on the texture, react to changes in the texture, or react to new textures either created or downloaded to the application in runtime. The texture map provides the color (and, optionally, transparency) information for the surface of the 2D or 3D object to which the texture is applied. Texture maps are commonly stored as an array of pixel information that is read from a file or from memory. Normal mapping may be defined as a technique for simulating the appearance of lighting of bumps and dents on a surface texture. Normal maps may be used to add additional detail to surfaces without using more polygons. Normal maps are commonly stored as regular RGB images, where the RGB components corresponds to the X, Y, and Z coordinates, respectively, of the surface normal at the position of the corresponding pixel of the surface. As will be understood, normal maps are stored in a surface's tangent space. Often times, a normal map may be difficult or tedious for an artist or programmer to create (and may require use of additional third-party software), especially if a normal map is needed for every texture used in an application, e.g., a game. Further, the greater number of normal maps that are supplied by the programmer, the greater the size of the resulting application file, resulting in greater bandwidth consumption and longer download times for the end user.

Moving to the central portion of FIG. 1, the rendering/animation infrastructure is shown in block diagram form, which may include rendering/animation engine 106 and its corresponding Application Programmer Interface (API) 108 that programmers and game developers may leverage to add 2D and 3D animation effects to their games and other applications. For example, in the case of the Sprite Kit rendering and animation infrastructure provided by APPLE INC., programmers may create and leverage the properties of various objects such as: Scenes, Sprites, Nodes, Actions, and Physics Bodies, via the provided Sprite Kit API, thus abstracting the implementation details of the complex underlying animation processes from the programmer.

Finally, in the right-hand portion of FIG. 1, the output of the rendering/animation engine, 3D rendering with lighting effects 110 is shown in block diagram form. One goal of the present disclosure is to provide techniques for achieving an output that is nearly indistinguishable from the output 110 shown in FIG. 1—without the need for the user to supply the normal map 104 for all textures to be rendered. In fact, as will be explained in further detail below, according to some embodiments, by rendering the 3D effects on a per-pixel basis in near real-time, the techniques disclosed herein may allow for: more efficient rendering on smaller objects; customizable and dynamic lighting properties; and the ability to render lighting effects on user-created content within applications in real-time or near real-time. The techniques disclosed herein may also provide a higher quality result than existing techniques, due at least in part to the iterative nature of the techniques and the fact that the amount of iteration may be scaled based on available processing power and/or image type, as will be discussed in further detail below.

Figure 2:
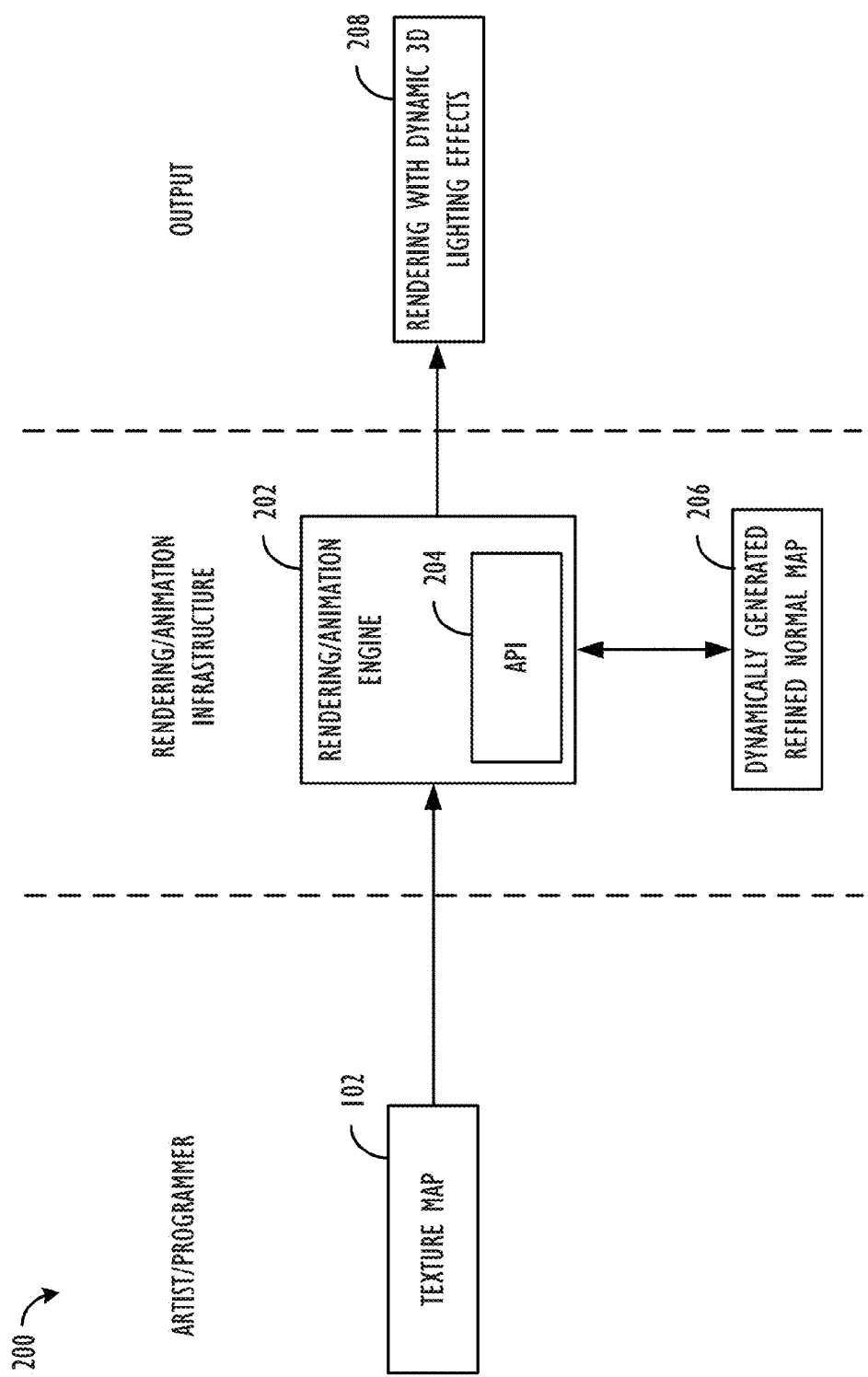
FIG. 2 illustrates an improved graphics rendering and animation infrastructure, in accordance with one embodiment.

Referring now to FIG. 2, an improved graphics rendering and animation infrastructure 200 is shown, in accordance with one embodiment. Unlike FIG. 1, the normal map 104 is not provided by the artist/programmer. Instead the rendering/animation engine 202, e.g., via calls to its API 204, creates dynamically-generated refined normal map 206 on a per-pixel basis in near real-time. Dynamically-generated refined normal map 206 is then used to create the graphical output image that is dynamically rendered with 3D lighting effects 208.

Figure 3:
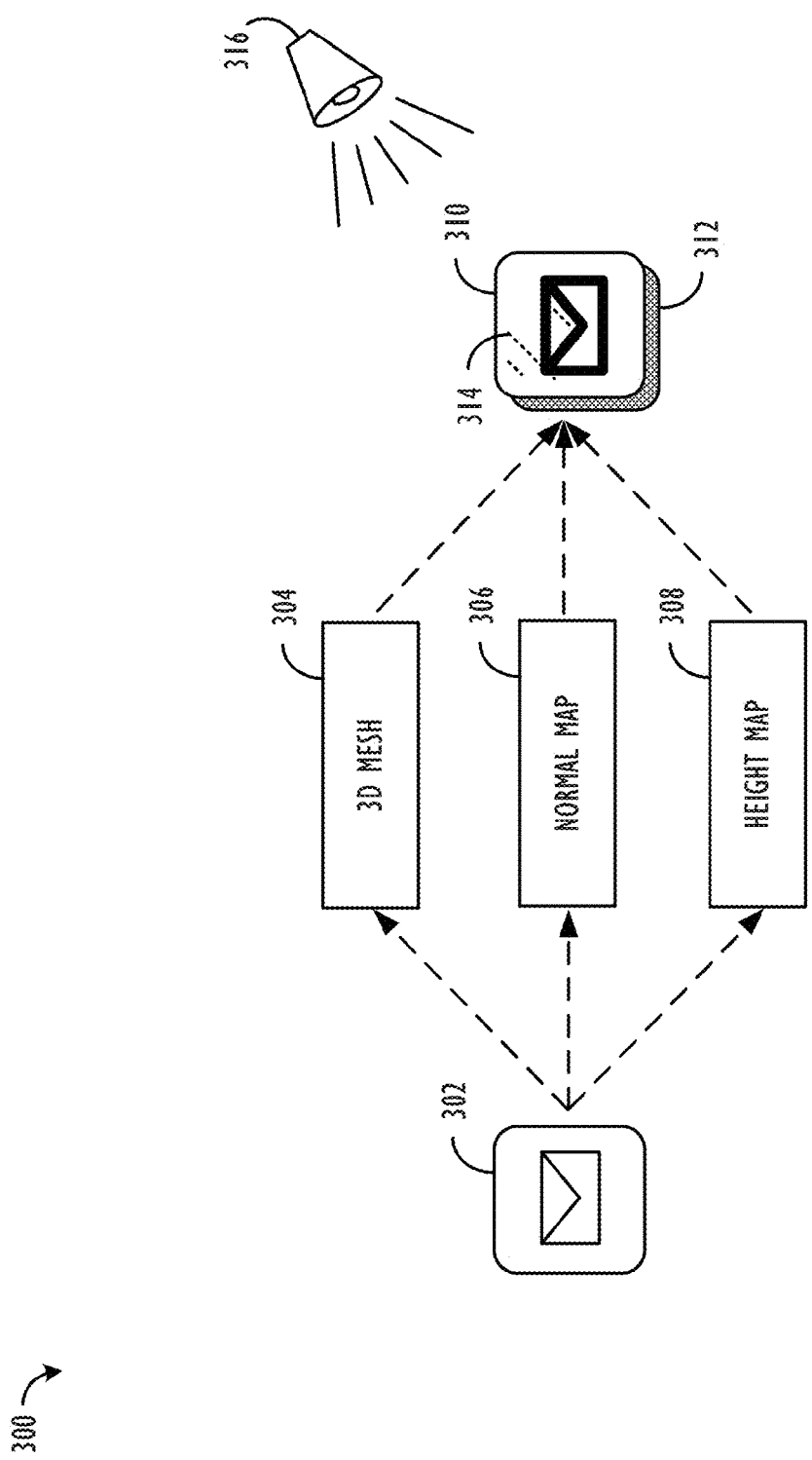
FIG. 3 illustrates various potential ways of generating dynamic, real-time 3D lighting effects for a 2D texture without a programmer-supplied normal map, in accordance with some embodiments.

Referring now to FIG. 3, various potential ways 300 of generating dynamic, real-time 3D lighting effects for a 2D texture without a programmer-supplied normal map are shown in block diagram form, in accordance with some embodiments. An exemplary 2D sprite texture 302 is shown on the left-hand side of FIG. 3 that looks like an exemplary OS icon, having an envelope inside of a square with rounded corners. Texture 302 is representative of the type of texture map that a programmer may want to use in a game or other application and to which he or she may desire to apply 3D lighting effects. However, as described above, in this embodiment, the programmer does not have to supply the normal map to the rendering engine along with texture 302. In fact, texture 302 may not be provided by the programmer at all and/or the programmer may be unaware of texture 302, e.g., if it is a common OS-level icon. Thus, whether the programmer supplies the texture map or the texture map comes from some other source (e.g., a texture that is dynamically created or modified by the user in the application, a texture downloaded from the Internet, or a texture supplied by some other layer in the application framework), one or more of a variety of potential methods as discussed herein may be used by the improved rendering/animation engine 202 to apply refined, high fidelity 3D lighting effects to the texture 302. (The dashed-line nature of the arrows in FIG. 3 indicates that these approaches are optional.)

The first approach may be to actually build a 3D mesh 304 representative of the texture map 302. Such a process may proceed according to known techniques, such as creating vertices over the surface of the texture at the locations of significant changes in height on a height map created over the texture. The mesh could then be constructed by connecting the resulting vertices.

Alternately, as discussed above, the process may proceed to dynamically generate a normal map 306 for the texture map. The normal map 306 may be created by taking the gradient, i.e., the derivative, of a height map created over the texture. Using this approach, the "bumpiness" or "smoothness" of the normal map may be controlled, e.g., by programmer-controlled parameters, system defaults, the size of the normal map being created, dynamic properties being controlled at run-time by the user of the application, or any other possible means. The amount of "bumpiness" or "smoothness" of the normal map may also be based, at least in part, on what type of texture is being analyzed. For example, a hand-drawn texture or computer-generated art with large portions of uniformly-colored flat surfaces may need less smoothing than a photographic image that has a large amount of noise in it. Edge detection algorithms may also be used to create masks as input to smoothing operations to ensure that important details in the image are not overly smoothed. Adjusting the bumpiness" or "smoothness" of the normal map in real-time allows the program or programmer a finer degree of control over the "look and feel" of the rendered 3D effects to suit the needs of a given implementation. Such a degree of control would not be possible in prior art rendering/animation systems, wherein the normal map is constructed a priori by an artist or the programmer, and then passed to the program, where it remains static during the execution of the application.

Finally, the process may proceed to create a height map 308 for the texture map, for example by converting the color values of the pixels in the texture map to luminance values, according to known techniques. This approach, while requiring the least amount of preprocessing, would potentially require the greatest amount of run-time processing, due to the fact that the shader would be forced to estimate the normal vectors for each pixel in the surface in real-time, which may involve sampling neighboring pixels. This process is also not necessarily cache coherent, and therefore potentially more costly for this reason, as well.

The result of the various potential processes shown in FIG. 3 would be an output image 310 that is rendered with various dynamic 3D lighting effects, for example, shadow layer 312 or specular shine 314, as though the texture 302 were three-dimensional and being lit by a hypothetical point light source 316 located at some position in the virtual rendering environment relative to texture 302. As mentioned above, these approaches allow the animation/rendering engine to determine the appropriate effects of light source 316 on each pixel of texture 302 on a frame-by-frame basis—and can allow for the customization of certain properties of the light source and the normal map, such as light color or blend amount.

Figure 4A:
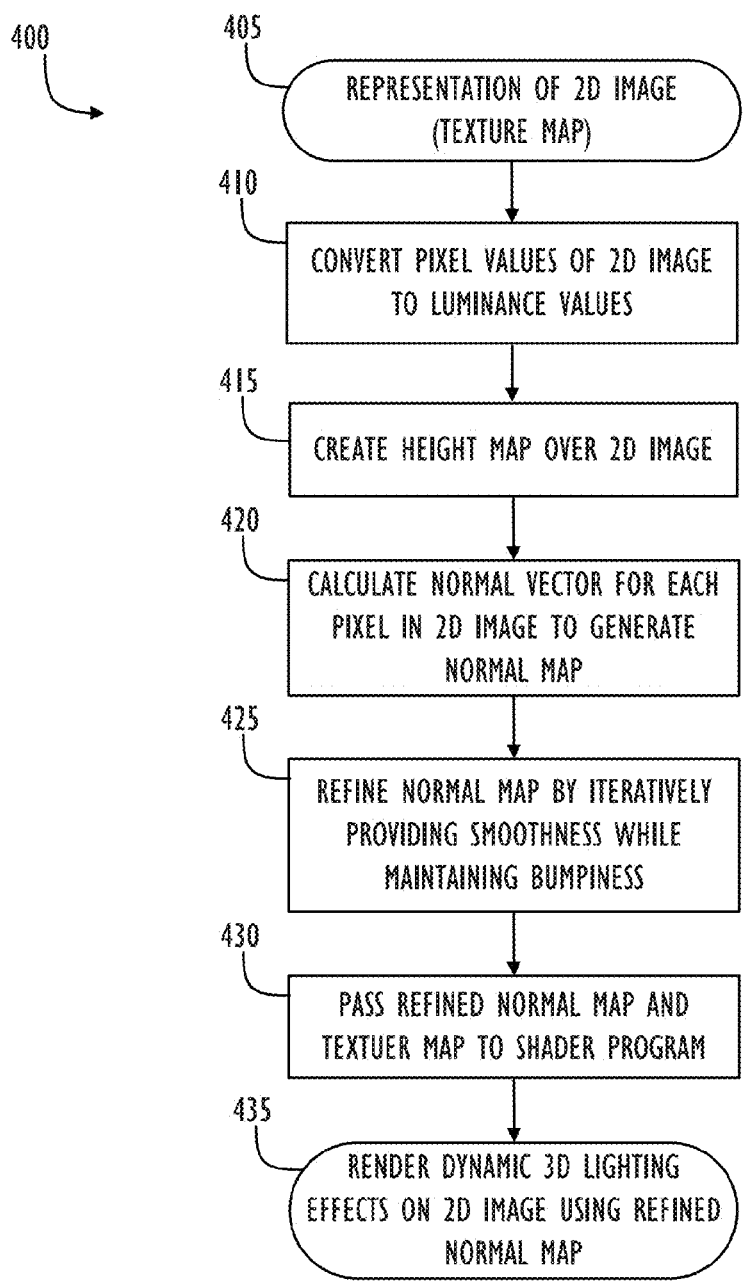
FIG. 4A illustrates, in flowchart form, a method of rendering 3D lighting effects on a 2D texture without a programmer-supplied normal map, in accordance with one embodiment.

Referring now to FIG. 4A, a method 400 of rendering dynamic 3D lighting effects on a 2D texture without a programmer-supplied normal map is shown in flowchart form, in accordance with one embodiment. First, the animation/rendering engine may obtain a representation of a 2D image, e.g., in the form of a texture map comprising pixel values consisting of RBG values and an alpha (i.e., transparency) value (Step 405). Next, the method may convert the pixel values of the representation of the 2D image into luminance values, according to known techniques (Step 410). These luminance values may then be used to create a height map for the 2D representation of the image (Step 415). Next, the process may calculate a normal vector for each pixel in the 2D representation of the image to generate a normal map (Step 420). In one embodiment, the process of calculating the normal vector for each pixel comprises computing the gradient of the height map (i.e., the luminance value) at the position of the pixel being analyzed and then traversing each of the pixels in the image, applying the gradient as the image is traversed, thus allowing the process to infer a 3D surface from the 2D representation. The gradient, in this context, is the rate of change of the luminance between neighboring pixels. Next, the normal map may be refined by iteratively providing smoothness, while maintaining overall bumpiness, as will be explained in further detail in relation to FIG. 4B (Step 425). Next, the dynamically-generated refined normal map and texture map may be passed to a shader program (Step 430), which shader program may be written to interpret the normal information and incoming pixel data from the texture map in order to render 3D lighting effects on the texture map. For example, the refined normal map information may be used by the shader to dynamically create specular highlighting and shading effects on the texture map (Step 435). In some embodiments, normal and height maps may be cached to avoid re-computation. Further, if images are retrieved from a server remote to the device displaying the textures, the normal maps and height maps maybe be generated and cached on the server for delivery to the device.

Figure 4B:
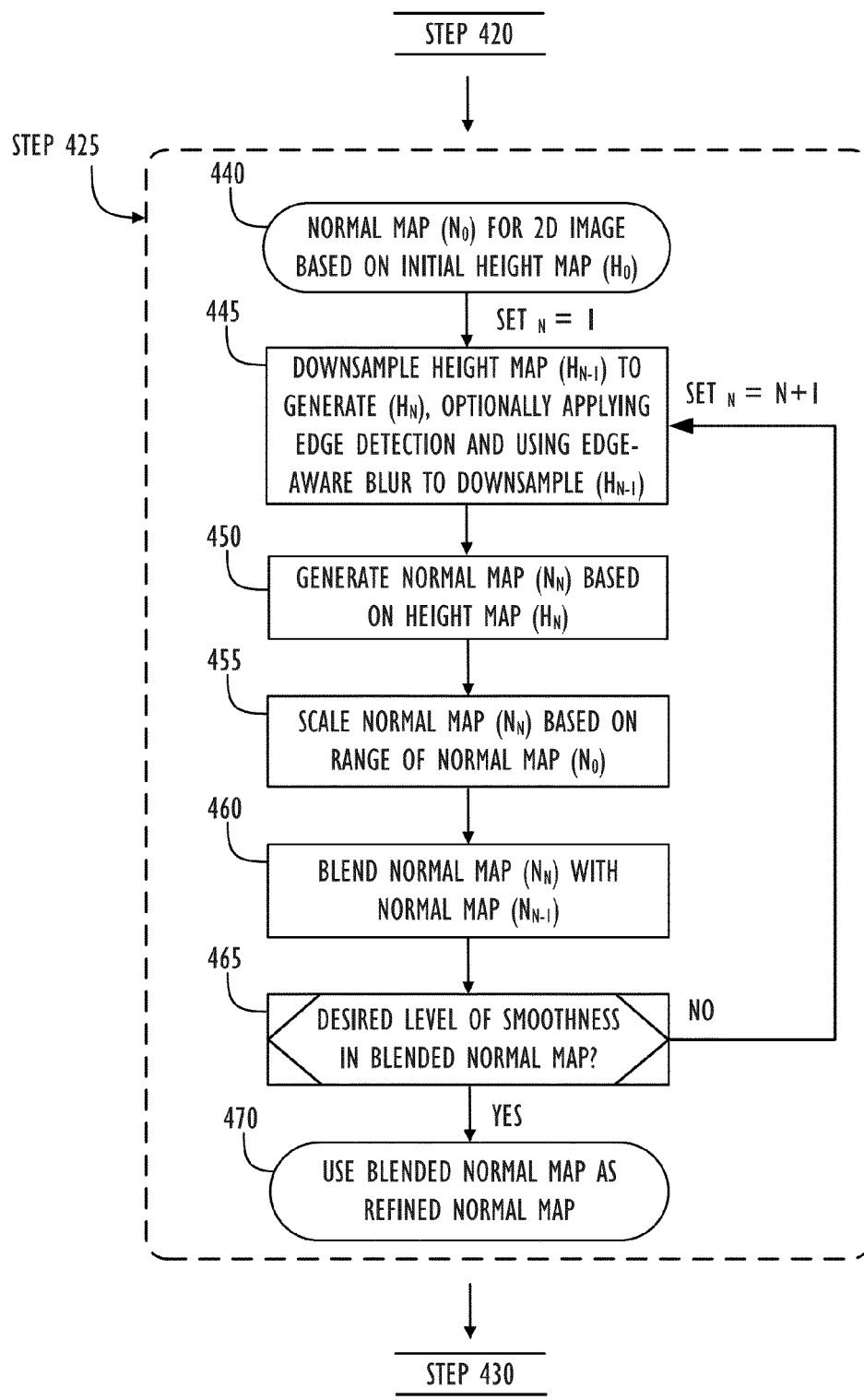
FIG. 4B illustrates, in flowchart form, an iterative method of creating a refined normal map, in accordance with one embodiment.

Referring now to FIG. 4B, Step 425 of method 400 is shown in flowchart form in greater detail, in accordance with one embodiment. First, the normal map refining process begins at Step 440 by obtaining the normal map ($N_0$) that was generated for the 2D image at Step 420 based on the initial height map (Ho) that was generated for the 2D image at Step 425. Next, with the value of subscript, $_N$, set to 1, the process proceeds to downsample the height map ($H_{N-1}$) to generate the downsampled height map for the current iteration of the loop, ($H_N$). This process may optionally include first using an edge detection process, e.g., a Sobel Filter, and an edge-aware blurring algorithm in the downsampling of height map ($H_{N-1}$) to generate ($H_N$). In such an embodiment, if the edge detection process detects an edge(s) in the images, the edge-aware blurring algorithm can perform limited or no blurring on such edge regions so that the edges of textures are not undesirably smoothed over by the blurring algorithm. The edge-aware blurring algorithm may also take the transparency value of the pixel in the texture map into consideration when blurring the pixel's value. For example, by preserving the alpha values of the pixels in the original image, the algorithm may ensure that, if a particular pixel is 100% transparent (or within a threshold of being 100% transparent where its value would be imperceptible to a viewer in the ultimate display space), it will not result in a random artifact in the normal map, even if the calculated normal vector for the pixel is a very small value, due to, e.g., the influence of its neighboring pixels. In some embodiments, the size of the blur (e.g., the blur radius in the case of a Gaussian blur) is selectable or determinable according to whether the texture for which the normal map is being generated comprises hand-drawn art (e.g., game art) or a photographic image. For example, it has been determined that the blur radius should be larger for photographic images, but smaller for hand-drawn art because hand-drawn art tends to have many sharp edges. According to further embodiments, the process may examine pixel variance levels in the texture to intelligently determine what size of blurring filter to use. For example, a comparatively noisy image, such as a photograph, may benefit from a blur radius of 9 pixels, whereas a less noisy image, such as hand-drawn game art, may benefit from a smaller blur radius, e.g., 3 pixels.

Next, the normal map refining process may generate the normal map for the current iteration of the loop ($N_N$) at Step 450, based on the downsampled height map ($H_N$) that was generated in Step 445. As discussed above, the normal map may be created by taking the gradient, i.e., the derivative, of the height map created over the texture. Next, the process may scale the normal map for the current iteration of the loop ($N_N$) based on the range of the normal map for the first iteration of the loop, i.e., ($N_0$). According to some embodiments, the process of scaling may comprise linearly interpolating the values in ($N_N$) between the range of the values in ($N_0$), such that the min and max values in ($N_N$) are the same as those in ($N_0$) (Step 455). The goal of the scaling process is to preserve the peaks and valleys of the original image.

Next, the process may blend the normal map generated for the current iteration of the loop ($N_N$) with the normal map generated for the previous iteration of the loop ($N_{N-1}$) (Step 460). The blending process allows the subsequent iterations of the loop to include influence from the details gained from each of the previous iterations of the loop. Although any suitable form of blending may be used to blend the normal maps, according to one embodiment, an overlay-style blend is preferred. According to such an embodiment, the following equations may be used to determine the output value of the blending process:

$$\text{Composite}=(N_{N-1})*(N_{N-1}+(2*(1-N_{N-1}))) \quad \text{(Eqn. 1)}$$

$$\text{Output}=(\text{Composite}*\text{Ratio})+(N_{N-1}*(1-\text{Ratio})) \quad \text{(Eqn. 2)},$$

where $N_{N-1}$ is the value of the normal vector for the previous iteration of the loop, $N_N$ is the value of the normal vector for the current iteration of the loop, and Ratio is a ratio of the weights given to the pixel values of the texture map from the previous iteration of the loop and the pixel values of the texture map from the current iteration of the loop. Other values may also be used for the "Ratio" variable, such as ratios between the normal map values themselves from the previous iteration and the current iteration (rather than the ratio of the texture maps).

Finally, the process may determine whether or not the desired level of smoothness has been achieved in the blended normal map (Step 465). If so, then the process may proceed to use the blended normal map as the refined normal map (Step 470), and proceed with the rest of method 400 by returning to execution at Step 435. If, instead, the desired level of smoothness has not been achieved in the blended normal map at Step 465, the process may increment the values of subscript, $_N$, by 1, and return to Step 445. This would begin the first subsequent iteration of the normal map refinement loop. For the next iteration of the loop (and all subsequent iterations), the amount of downsampling may be increased so that the generated height map ($H_N$) is smoother than the height map generated by the previous iteration of the loop ($H_{N-1}$). In some embodiments, this may comprise increase the blur radius of a Gaussian blur in a systemic fashion, e.g., using a blur radius of 2 pixels, then 4, then 8, etc., as the loop proceeds through subsequent iterations.

The determination of when to stop the iterations of the loop at Step 465 may be made in any of several ways. For example, the user/programmer of the animation/rendering engine can determine or explicitly specify when to stop the iteration process, or the engine itself may undertake an analysis of the input texture, and based on the sharpness, determine how many iterations of the loop to make. For example, as described above, more iterations of smoothing may be needed with photographs, whereas fewer iterations of the loop may be needed for game-art or other hand-drawn art with sharp edges and large regions of uniform coloration. Further, the process may determine to stop the iterations if the deltas between all pixels on subsequently created normal maps are within a given threshold. In other words, if no new information is being gained from the subsequent loop iterations, then the process may stop. The value of the threshold itself may also be controlled based on how bumpy or smooth the programmer wants the resultant 3D rendering to appear. As will be understood, the earlier that the iteration process may be exited, the more computationally efficient the normal map generation process may become. Applying the techniques outlined above may allow for the creation of refined, high fidelity normal maps (i.e., normal maps maintaining the original bumpiness of the image) that preserve sharp edges the around objects being rendered, while significantly smoothing out the surface normals located on the interior surfaces of the objects being rendered.

Figure 5:
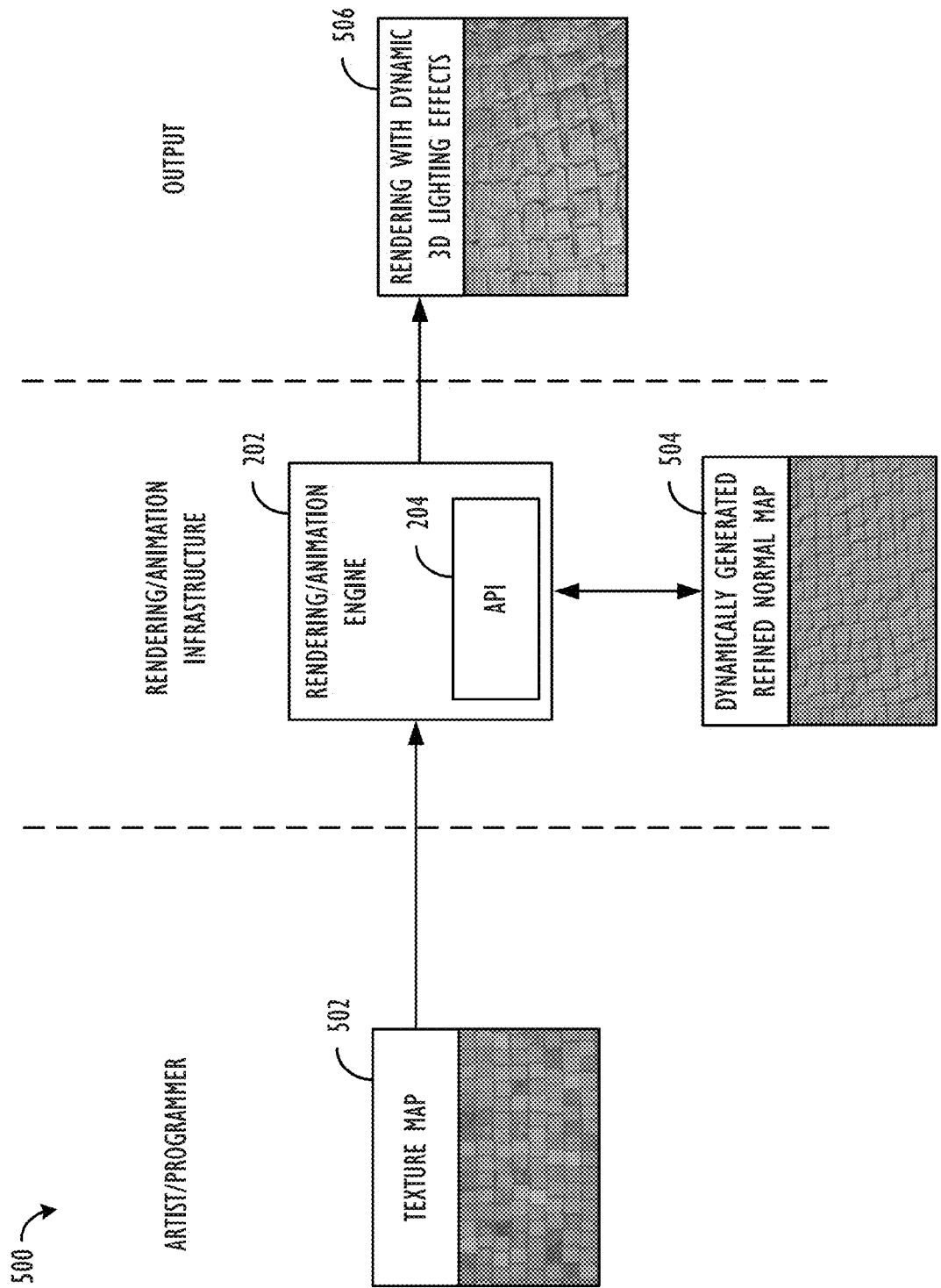
FIG. 5 illustrates an improved graphics rendering and animation infrastructure, in accordance with one embodiment.

Referring now to FIG. 5, an improved refined, high fidelity graphics rendering and animation infrastructure 500 is shown, in accordance with one embodiment. FIG. 5 is similar to FIG. 2, with the additional information of several exemplary textures and maps to help illustrate what is being input to—and created by—the improved refined, high fidelity graphics rendering and animation infrastructure. First, texture map 502 shows an exemplary texture map image file that a programmer may want to use in his application or which may, e.g., be selected and downloaded into the application by a user at runtime in the application. Textures often take the form of relatively small images that may be repeated or tiled over larger surfaces in a rendered scene to give the impression that a given surface is made of a particular kind of material, e.g., tiles, as is shown in texture map 502. As described above, improved rendering/animation engine 202 may be configured to dynamically generate refined normal map 504 in real-time. As shown in normal map 504, brighter colors imply that the texture is coming "out of" the page, and darker imply that the texture is going "into" the page. Normal map 504 may be dynamically generated and refined according to any of the techniques described above. Finally, the output, represented by the refined, high fidelity 3D rendering with lighting effects 506 reflects the fact that the inferred heights and bumpiness of the texture encapsulated in dynamically generated refined normal map 504 have resulted in different lighting effects being applied to different parts of the texture 502. For example, the left-hand side of 3D rendering 506 appears to be slightly brighter than the right-hand side, perhaps due to determined height differences across the textured surface.

Figure 6:
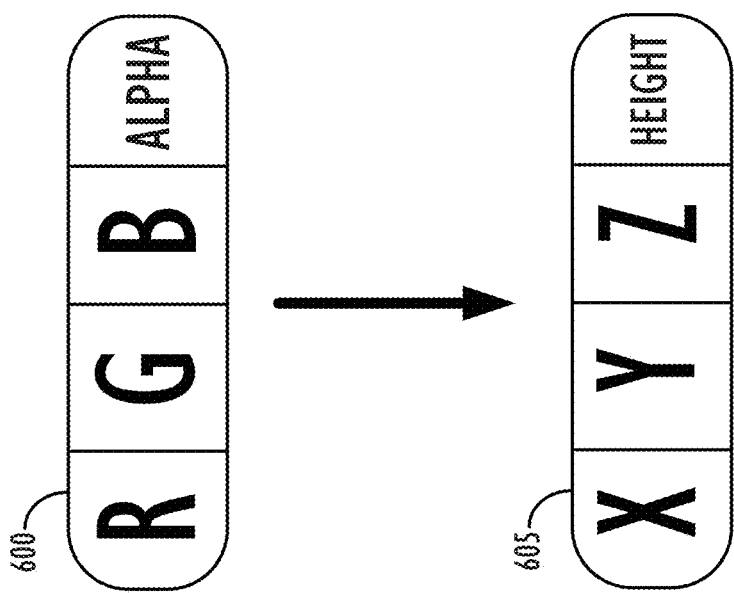
FIG. 6 illustrates a repurposed texture map data structure for storing normal map and height map information, in accordance with one embodiment.

Referring now to FIG. 6, a repurposed texture map data structure 605 for storing normal map and height map information is shown, in accordance with one embodiment. As is known by those of skill in the art, pixel information for texture maps may be stored in the form of an RGBa data structure 600, where 'R' refers to the red channel value of the pixel, 'G' refers to the green channel value of the pixel, 'B' refers to the blue channel value of the pixel, and 'a' refers to the transparency level of the pixel. According to some embodiments disclosed herein, this data structure may be modified and used a repurposed texture map data structure 605 for storing normal map and height map information, in the form of an XYZ height data structure, where 'X' refers to the x-component of the normal vector of the pixel, 'Y' refers to the y-component of the normal vector of the pixel, 'Z' refers to the z-component of the normal vector of the pixel, and 'HEIGHT' refers to the value of the height map at the location of the pixel. A shader program may then be written, such that it interprets the repurposed texture map data structure 605 to pull out the relevant normal map and height map information from the data structure to allow it to render the appropriate 3D lighting effects on the input 2D image. According to other embodiments, the repurposed texture map data structure 605 may only include the XYZ information and not include the height map information.

Figure 7:
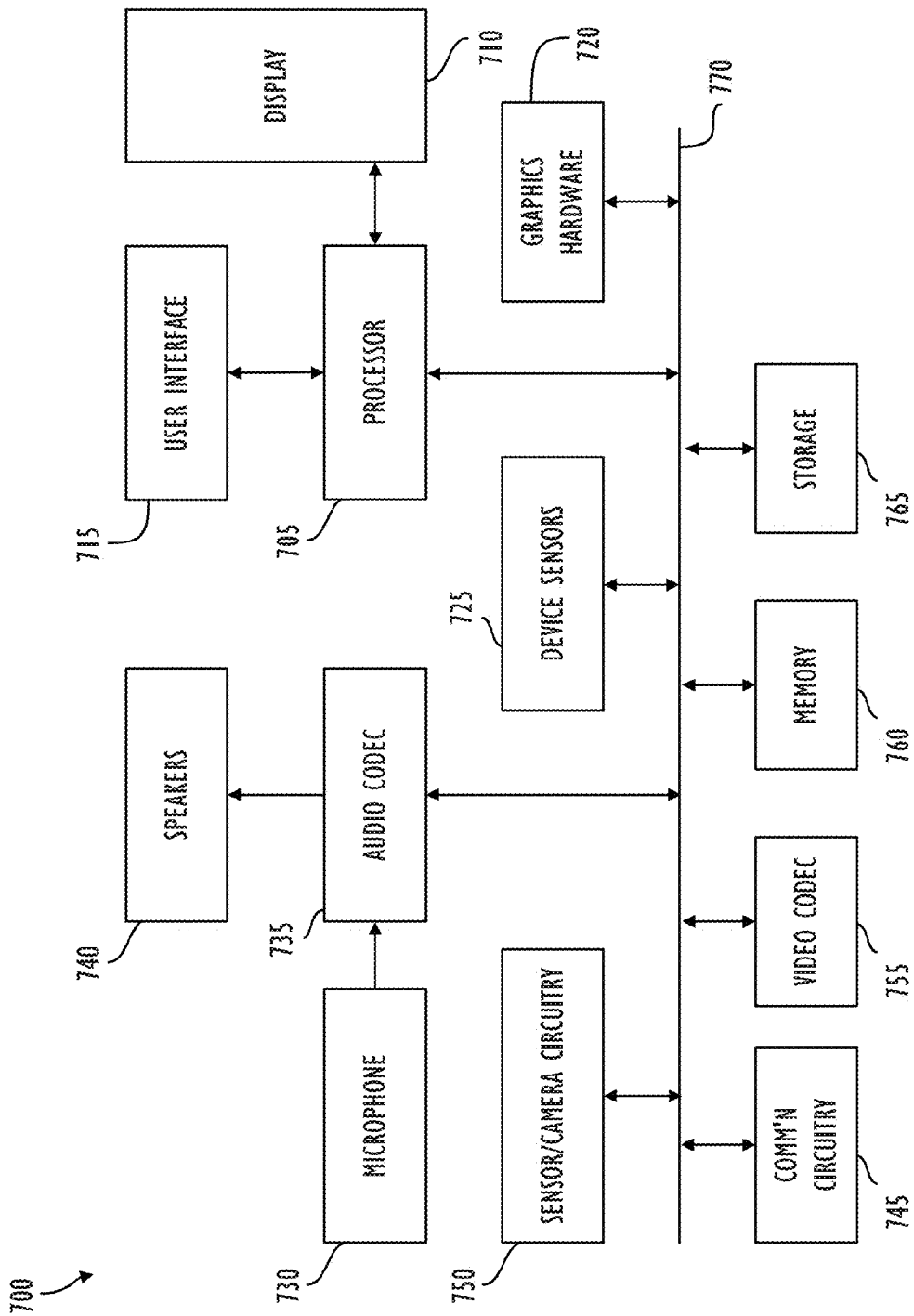
FIG. 7 illustrates a simplified functional block diagram of an illustrative electronic device, according to one embodiment.

Referring now to FIG. 7, a simplified functional block diagram of an illustrative electronic device 700 or "hosting device" is shown according to one embodiment. Electronic device 700 may include processor 705, display 710, user interface 715, graphics hardware 720, device sensors 725 (e.g., proximity sensor/ambient light sensor, accelerometer and/or gyroscope), microphone 730, audio codec(s) 735, speaker(s) 740, communications circuitry 745, digital image capture unit 750, video codec(s) 755, memory 760, storage 765, and communications bus 770. Electronic device 700 may be, for example, a personal digital assistant (PDA), personal music player, mobile telephone, or a notebook, laptop, or tablet computer system.

Processor 705 may be any suitable programmable control device capable of executing instructions necessary to carry out or control the operation of the many functions performed by device 700 (e.g., such as the processing of texture maps in accordance with operations in any one or more of the Figures). Processor 705 may, for instance, drive display 710 and receive user input from user interface 715 which can take a variety of forms, such as a button, keypad, dial, a click wheel, keyboard, display screen and/or a touch screen. Processor 705 may be a system-on-chip such as those found in mobile devices and include a dedicated graphics processing unit (GPU). Processor 705 may be based on reduced instruction-set computer (RISC) or complex instruction-set computer (CISC) architectures or any other suitable architecture and may include one or more processing cores. Graphics hardware 720 may be special purpose computational hardware for processing graphics and/or assisting processor 705 process graphics information. In one embodiment, graphics hardware 720 may include one or more programmable graphics processing units (GPUs).

Sensor and camera circuitry 750 may capture still and video images that may be processed to generate images, at least in part, by video codec(s) 755 and/or processor 705 and/or graphics hardware 720, and/or a dedicated image processing unit incorporated within circuitry 750. Images so captured may be stored in memory 760 and/or storage 765. Memory 760 may include one or more different types of media used by processor 705, graphics hardware 720, and image capture circuitry 750 to perform device functions. For example, memory 760 may include memory cache, read-only memory (ROM), and/or random access memory (RAM). Storage 765 may store media (e.g., audio, image and video files), computer program instructions or software, preference information, device profile information, and any other suitable data. Storage 765 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 760 and storage 765 may be used to retain computer program instructions or code organized into one or more modules and written in any desired computer programming language. When executed by, for example, processor 705, such computer program code may implement one or more of the methods described herein.

Figure 8:
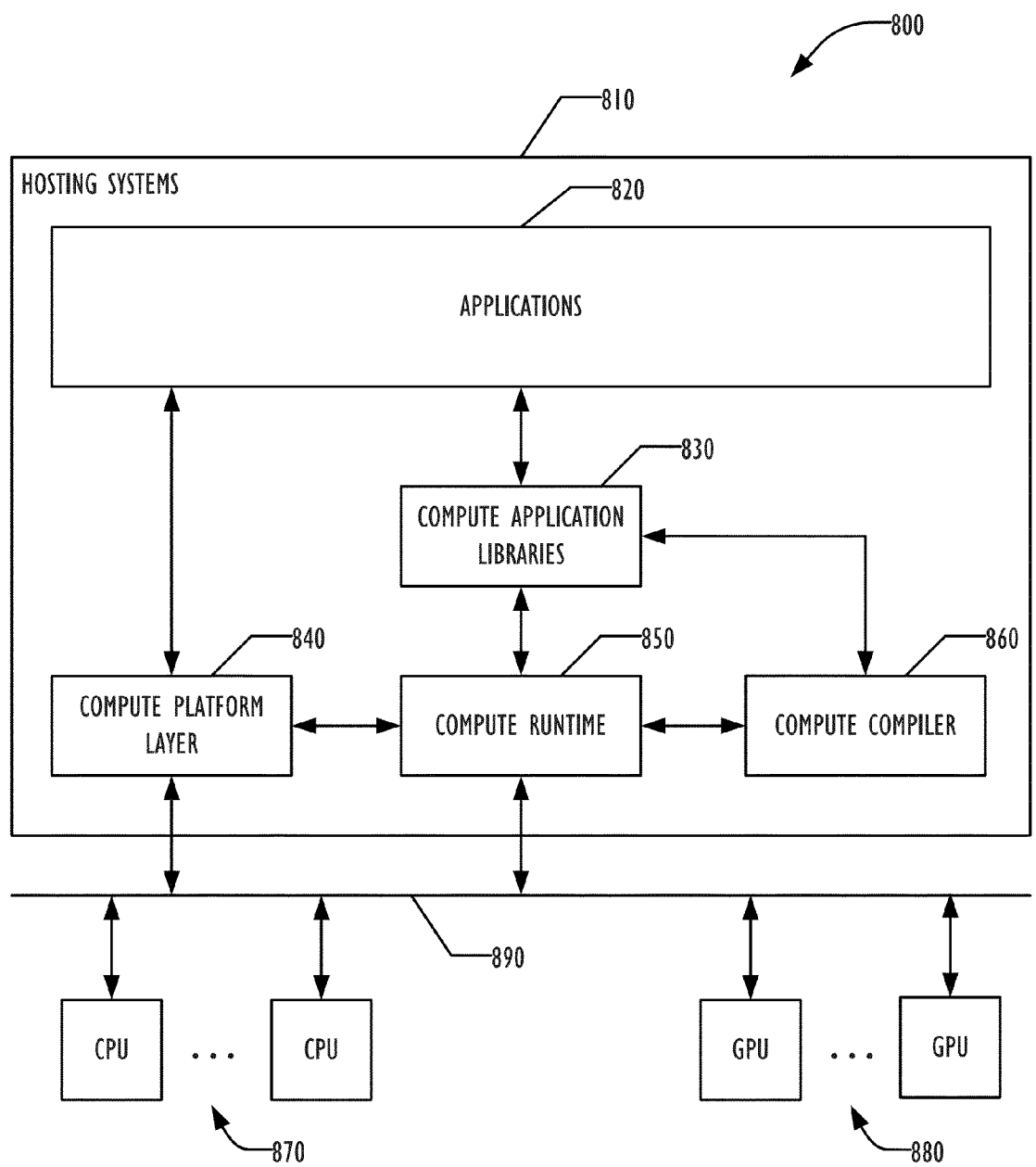
FIG. 8 is a block diagram illustrating one embodiment of a graphics rendering system.

FIG. 8 is a block diagram illustrating one embodiment of a graphics rendering system 800 that uses computing devices including CPUs and/or GPUs to perform parallel computing for applications. System 800 may implement a parallel computing architecture. In one embodiment, system 800 may be a graphics system including one or more host processors coupled with one or more CPUs 870 and one or more GPUs 880 through a data bus 890. The plurality of host processors may be networked together in a host system 810. The plurality of CPUs 870 may include multi-core CPUs from different vendors. A computer processing unit or compute unit, such as CPU or GPU, may be associated by a group of capabilities. For example, a GPU may have dedicated texture rendering hardware. Another media processor may be a GPU supporting both dedicated texture rendering hardware and double precision floating point arithmetic. Multiple GPUs may be connected together.

In one embodiment, the host systems 810 may support a software stack. The software stack can include software stack components such as applications 820, compute application libraries 830, a compute platform layer 840, e.g., an OpenCL platform, a compute runtime layer 850, and a compute compiler 860. An application 820 may interface with other stack components through API calls. One or more processing elements or threads may be running concurrently for the application 820 in the host systems 810. The compute platform layer 840 may maintain a data structure, or a computing device data structure, storing processing capabilities for each attached physical computing device. In one embodiment, an application may retrieve information about available processing resources of the host systems 810 through the compute platform layer 840. An application may select and specify capability requirements for performing a processing task through the compute platform layer 840. Accordingly, the compute platform layer 840 may determine a configuration for physical computing devices to allocate and initialize processing resources from the attached CPUs 870 and/or GPUs 880 for the processing task.

The compute runtime layer 809 may manage the execution of a processing task according to the configured processing resources for an application 803, for example, based on one or more logical computing devices. In one embodiment, executing a processing task may include creating a compute program object representing the processing task and allocating memory resources, e.g. for holding executables, input/output data etc. An executable loaded for a compute program object may be a compute program executable. A compute program executable may be included in a compute program object to be executed in a compute processor or a compute unit, such as a CPU or a GPU. The compute runtime layer 809 may interact with the allocated physical devices to carry out the actual execution of the processing task. In one embodiment, the compute runtime layer 809 may coordinate executing multiple processing tasks from different applications according to run time states of each processor, such as CPU or GPU configured for the processing tasks. The compute runtime layer 809 may select, based on the run time states, one or more processors from the physical computing devices configured to perform the processing tasks. Performing a processing task may include executing multiple threads of one or more executables in a plurality of physical computing devices concurrently. In one embodiment, the compute runtime layer 809 may track the status of each executed processing task by monitoring the run time execution status of each processor.

The runtime layer may load one or more executables as compute program executables corresponding to a processing task from the application 820. In one embodiment, the compute runtime layer 850 automatically loads additional executables required to perform a processing task from the compute application library 830. The compute runtime layer 850 may load both an executable and its corresponding source program for a compute program object from the application 820 or the compute application library 830. A source program for a compute program object may be a compute program source. A plurality of executables based on a single compute program source may be loaded according to a logical computing device configured to include multiple types and/or different versions of physical computing devices. In one embodiment, the compute runtime layer 850 may activate the compute compiler 860 to online compile a loaded source program into an executable optimized for a target processor, e.g., a CPU or a GPU, configured to execute the executable.

An online compiled executable may be stored for future invocation in addition to existing executables according to a corresponding source program. In addition, the executables may be compiled offline and loaded to the compute runtime 850 using API calls. The compute application library 830 and/or application 820 may load an associated executable in response to library API requests from an application. Newly compiled executables may be dynamically updated for the compute application library 830 or for the application 820. In one embodiment, the compute runtime 850 may replace an existing compute program executable in an application by a new executable online compiled through the compute compiler 860 for a newly upgraded version of computing device. The compute runtime 850 may insert a new executable online compiled to update the compute application library 830. In one embodiment, the compute runtime 850 may invoke the compute compiler 860 when loading an executable for a processing task. In another embodiment, the compute compiler 860 may be invoked offline to build executables for the compute application library 830. The compute compiler 860 may compile and link a compute kernel program to generate a computer program executable. In one embodiment, the compute application library 830 may include a plurality of functions to support, for example, development toolkits and/or image processing. Each library function may correspond to a computer program source and one or more compute program executables stored in the compute application library 830 for a plurality of physical computing devices.

It is to be understood that the above description is intended to be illustrative, and not restrictive. The material has been presented to enable any person skilled in the art to make and use the invention as claimed and is provided in the context of particular embodiments, variations of which will be readily apparent to those skilled in the art (e.g., some of the disclosed embodiments may be used in combination with each other). In addition, it will be understood that some of the operations identified herein may be performed in different orders. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory program storage device, readable by a programmable control device and comprising instructions stored thereon to cause one or more processing units to:
   (a) obtain a representation of a first two-dimensional image, wherein the representation comprises a first plurality of pixels, and wherein each pixel in the first plurality of pixels comprises a first plurality of pixel color values and a transparency value;
   (b) convert the first plurality of pixel color values into a luminance value for each pixel in the first plurality of pixels;
   (c) create a height map over the first two-dimensional image using the converted luminance values for each pixel in the first plurality of pixels, wherein each position in the height map corresponds to a pixel from the first plurality of pixels;
   (d) create a first normal map over the first two-dimensional image by calculating a normal vector for each pixel in the height map;
   (e) create a first blurred height map according to a first parameter;
   (f) create a second normal map over the first two-dimensional image by calculating a normal vector for each pixel in the first blurred height map;
   (g) scale the second normal map in accordance with a range of the first normal map;
   (h) blend the second normal map with the previously-created normal map to create a resultant normal map; and
   (i) repeat steps (e)-(h) iteratively, increasing the value of the first parameter with each iteration, until the resultant normal map has a desired level of smoothness.

2. The non-transitory program storage device of claim 1, wherein the instructions to calculate the normal vector for a respective pixel in step (d) further comprise instructions to calculate the gradient of the height map at the position corresponding to the respective pixel.

3. The non-transitory program storage device of claim 2, wherein the instructions to calculate the normal vector for a respective pixel in step (f) further comprise instructions to calculate the gradient of the first blurred height map at the position corresponding to the respective pixel.

4. The non-transitory program storage device of claim 1, further comprising instructions to determine the first parameter based, at least in part, on an amount of variance in the first plurality of pixel color values.

5. The non-transitory program storage device of claim 1, further comprising instructions to perform an edge detection process on the height map before executing the instructions to create the first blurred height map.

6. The non-transitory program storage device of claim 5, wherein the instructions to create the first blurred height map comprise instructions to perform an edge-aware blur.

7. The non-transitory program storage device of claim 1, wherein the instructions to scale the second normal map further comprise instructions to scale the second normal map to maintain the same range as the range of the first normal map.

8. The non-transitory program storage device of claim 1, wherein the desired level of smoothness is based, at least in part, upon: a specified value; an amount of variance in the first plurality of pixel color values; or an image type of the first two-dimensional image.

9. A system, comprising:
   a memory having, stored therein, computer program code; and
   one or more processing units operatively coupled to the memory and configured to execute instructions in the computer program code that cause the one or more processing units to:
   (a) obtain a representation of a first two-dimensional image, wherein the representation comprises a first plurality of pixels, and wherein each pixel in the first plurality of pixels comprises a first plurality of pixel color values and a transparency value;
   (b) convert the first plurality of pixel color values into a luminance value for each pixel in the first plurality of pixels;
   (c) create a height map over the first two-dimensional image using the converted luminance values for each pixel in the first plurality of pixels, wherein each position in the height map corresponds to a pixel from the first plurality of pixels;
   (d) create a first normal map over the first two-dimensional image by calculating a normal vector for each pixel in the height map;
   (e) create a first blurred height map according to a first parameter;
   (f) create a second normal map over the first two-dimensional image by calculating a normal vector for each pixel in the first blurred height map;
   (g) scale the second normal map in accordance with a range of the first normal map;
   (h) blend the second normal map with the previously-created normal map to create a resultant normal map; and
   (i) repeat steps (e)-(h) iteratively, increasing the value of the first parameter with each iteration, until the resultant normal map has a desired level of smoothness.

10. The system of claim 9, wherein the instructions to calculate the normal vector for a respective pixel in step (d) further comprise instructions to calculate the gradient of the height map at the position corresponding to the respective pixel.

11. The system of claim 10, wherein the instructions to calculate the normal vector for a respective pixel in step (f) further comprise instructions to calculate the gradient of the first blurred height map at the position corresponding to the respective pixel.

12. The system of claim 9, further comprising instructions to determine the first parameter based, at least in part, on an amount of variance in the first plurality of pixel color values.

13. The system of claim 9, further comprising instructions to perform an edge detection process on the height map before executing the instructions to create the first blurred height map.

14. The system of claim 13, wherein the instructions to create the first blurred height map comprise instructions to perform an edge-aware blur.

15. The system of claim 9, wherein the instructions to scale the second normal map further comprise instructions to scale the second normal map to maintain the same range as the range of the first normal map.

16. The system of claim 9, wherein the desired level of smoothness is based, at least in part, upon: a specified value; an amount of variance in the first plurality of pixel color values; or an image type of the first two-dimensional image.

17. A computer-implemented method, comprising:
   (a) obtaining a representation of a first two-dimensional image, wherein the representation comprises a first plurality of pixels, and wherein each pixel in the first plurality of pixels comprises a first plurality of pixel color values and a transparency value;
   (b) converting the first plurality of pixel color values into a luminance value for each pixel in the first plurality of pixels;
   (c) creating a height map over the first two-dimensional image using the converted luminance values for each pixel in the first plurality of pixels, wherein each position in the height map corresponds to a pixel from the first plurality of pixels;
   (d) creating a first normal map over the first two-dimensional image by calculating a normal vector for each pixel in the height map;
   (e) creating a first blurred height map according to a first parameter;
   (f) creating a second normal map over the first two-dimensional image by calculating a normal vector for each pixel in the first blurred height map;
   (g) scaling the second normal map in accordance with a range of the first normal map;
   (h) blending the second normal map with the previously-created normal map to create a resultant normal map; and
   (i) repeating steps (e)-(h) iteratively, increasing the value of the first parameter with each iteration, until the resultant normal map has a desired level of smoothness.

18. The method of claim 17, further comprising the act of determining the first parameter based, at least in part, on an amount of variance in the first plurality of pixel color values.

19. The method of claim 17, wherein the desired level of smoothness is based, at least in part, upon: a specified value; an amount of variance in the first plurality of pixel color values; or an image type of the first two-dimensional image.

20. The method of claim 17, further comprising the act of performing an edge detection process on the height map before creating the first blurred height map.

* * * * *